(12) United States Patent
Pasotti

(10) Patent No.: US 10,017,109 B2
(45) Date of Patent: Jul. 10, 2018

(54) VEHICLE INSTRUMENT PANEL EQUIPPED WITH A LED BACKLIGHTING DEVICE FOR LIGHTING A GRAPHIC AREA

(71) Applicant: Magneti Marelli S.p.A., Corbetta (IT)

(72) Inventor: Alessandro Pasotti, Milan (IT)

(73) Assignee: Magneti Marelli S.p.A., Corbetta (IT)

( * ) Notice: Subject to any disclaimer, the term of this patent is extended or adjusted under 35 U.S.C. 154(b) by 162 days.

(21) Appl. No.: 14/666,477

(22) Filed: Mar. 24, 2015

(65) Prior Publication Data

US 2015/0266419 A1    Sep. 24, 2015

(30) Foreign Application Priority Data

Mar. 24, 2014  (IT) .............................. TO2014A0244

(51) Int. Cl.
| | |
|---|---|
| *G01D 11/28* | (2006.01) |
| *B60Q 3/14* | (2017.01) |
| *G02B 19/00* | (2006.01) |
| *B60K 35/00* | (2006.01) |

(52) U.S. Cl.
CPC ................ *B60Q 3/14* (2017.02); *B60K 35/00* (2013.01); *G01D 11/28* (2013.01); *G02B 19/0023* (2013.01); *G02B 19/0061* (2013.01)

(58) Field of Classification Search
CPC .................................................... B60Q 3/004
See application file for complete search history.

(56) References Cited

U.S. PATENT DOCUMENTS

| | | | |
|---|---|---|---|
| 6,595,667 B1* | 7/2003 | Obata | B60K 35/00 362/23.15 |
| 2006/0087860 A1 | 4/2006 | Ishida | |
| 2012/0048177 A1* | 3/2012 | Tomono | G01D 11/28 116/288 |

FOREIGN PATENT DOCUMENTS

| | | |
|---|---|---|
| EP | 1182395 A2 | 2/2002 |
| EP | 2119958 A1 | 11/2009 |
| JP | 9152360 A | 6/1997 |
| JP | 2010276592 A | 12/2010 |

OTHER PUBLICATIONS

Nov. 11, 2014 Italian Search Report for Italian Patent Application No. TO20140244.

* cited by examiner

*Primary Examiner* — Sean Gramling
(74) *Attorney, Agent, or Firm* — Howard & Howard Attorneys PLLC

(57) ABSTRACT

In an instrument panel, a LED backlighting device has at least one LED source, the optical axis of which corresponds to the direction in which the intensity of the emitted light is maximum. The light of the LED source is reflected onto a graphic area by a first and a second reflecting surface. The first surface defines a first cavity and is aligned with the graphic area along an illumination axis spaced apart from the optical axis, while the second surface is aligned with the LED source along the optical axis and defines a second cavity communicating with the first cavity through an aperture. The second surface is a cylindrical surface, defined by an elliptical generatrix and configured so as to block the light rays that would be directed from the LED source onto the graphic area.

10 Claims, 4 Drawing Sheets

VEHICLE INSTRUMENT PANEL EQUIPPED WITH A LED BACKLIGHTING DEVICE FOR LIGHTING A GRAPHIC AREA

CROSS-REFERENCE TO RELATED APPLICATIONS

The present application claims priority to and all the benefits of Italian Patent Application No. TO2014A000244, filed on Mar. 24, 2014, both of which are hereby expressly incorporated herein by reference in their entirety.

BACKGROUND OF THE INVENTION

1. Field of the Invention

The present invention relates to a vehicle instrument panel equipped with a LED backlighting device for lighting a graphic area.

2. Description of the Related Art

In vehicle instrument panels, various graphic areas are provided in fixed positions and are configured to supply corresponding information to the driver. For example, these graphic areas could be represented by numbers, letters, graduated scales, graphical scales or bar graphs, logos, etc.

As a rule, the graphic areas are defined by transparent portions of a polycarbonate plate. These transparent portions are backlit by LEDs to make the corresponding information visible under night viewing conditions. Normally, the LEDs are arranged beneath the transparent portion to illuminate it directly. In particular, the LEDs are mounted on a printed circuit board (also indicated by the acronym PCB) that is spaced apart from and parallel to the polycarbonate plate, such that the optical axis of each LED is orthogonal to the associated transparent portion.

Solutions of this type, even if widely used, are not very satisfactory with regard to the uniformity of lighting over the entire graphic area. In fact, the light emitted by the LEDs has maximum intensity on its optical axis and decreases as the angle of emission increases with respect to this optical axis. In particular, the light intensity has a spatial emission curve that effectively follows Lambert's Law. Thus, when looking at the graphic area on the instrument panel the drive perceives a brighter point at the position of the underlying LED, while the light appears lower in the area surrounding this point.

It is known to adopt different solutions to overcome this lack of uniformity. One solution basically consists of adding a light-guide element, which conveys the light from the LEDs to the transparent portion to be lit, which defines the graphic area. In particular, the LEDs are arranged in a position at a distance from this transparent portion, while the faces of the light-guide element reflect the light rays and, at the same time, diffuse the light. Even though it is efficient, this solution is not optimal as it requires the design, manufacture and assembly of an additional component, namely the light-guide element. Furthermore, in certain cases this solution requires more space with respect to direct backlighting solutions.

Another known solution for providing uniform lighting is defined by a special treatment of the transparent portion to be lit, obtained, for example, by silk-screen printing processes. This treatment causes attenuation of the light that passes through the transparent portion of the polycarbonate plate and consequently alters the user's perception of light intensity.

This solution is also not very satisfactory, as the above-mentioned treatment requires an additional production process and, moreover, tends to decrease the efficiency of the light sources, reducing the overall light power transmitted through the graphic area.

JPH09152360 discloses a bar graph of a LED-lit instrument panel. The light is reflected by two reflective surfaces before arriving to the bar graph. The first of these reflective surfaces has a parabolic section and transmits mutually parallel light rays to a second reflective surface.

SUMMARY OF THE INVENTION

The object of the present invention is to provide a vehicle instrument panel equipped with a LED backlighting device for lighting a graphic area that enables solving the above-described problems in a simple and inexpensive manner.

According to the present invention, a vehicle instrument panel equipped with a LED backlighting device for lighting a graphic area is provided. The vehicle instrument panel includes a dial comprising at least one light permeable portion, which defines a graphic area, and a LED backlighting device for lighting the graphic area. The LED backlighting device includes at least one LED source having an optical axis corresponding to the direction in which the intensity of the light emitted into space is maximum. A reflector reflects the light of the LED source toward an outlet engaged by the light permeable portion. The reflector includes a first reflecting surface, which defines a first cavity and is aligned with the outlet along an illumination axis spaced apart from the optical axis. The optical axis and the illumination axis lie on the same plane (P); and a second reflecting surface, which is aligned with the LED source along the optical axis, and defines a second cavity communicating with the first cavity through an aperture and which reflects most of the incident light toward the aperture. The second reflecting surface blocks the light rays that would be directed by the LED source to the outlet. By cross-sectioning the second reflecting surface with said plane (P), the trace of said second reflecting surface comprises an elliptical arc.

Other objects, features and advantages of the present invention will be readily appreciated as the same becomes better understood after reading the subsequent description taken in connection with the accompanying drawings.

DETAILED DESCRIPTION OF THE INVENTION

Figure 1:
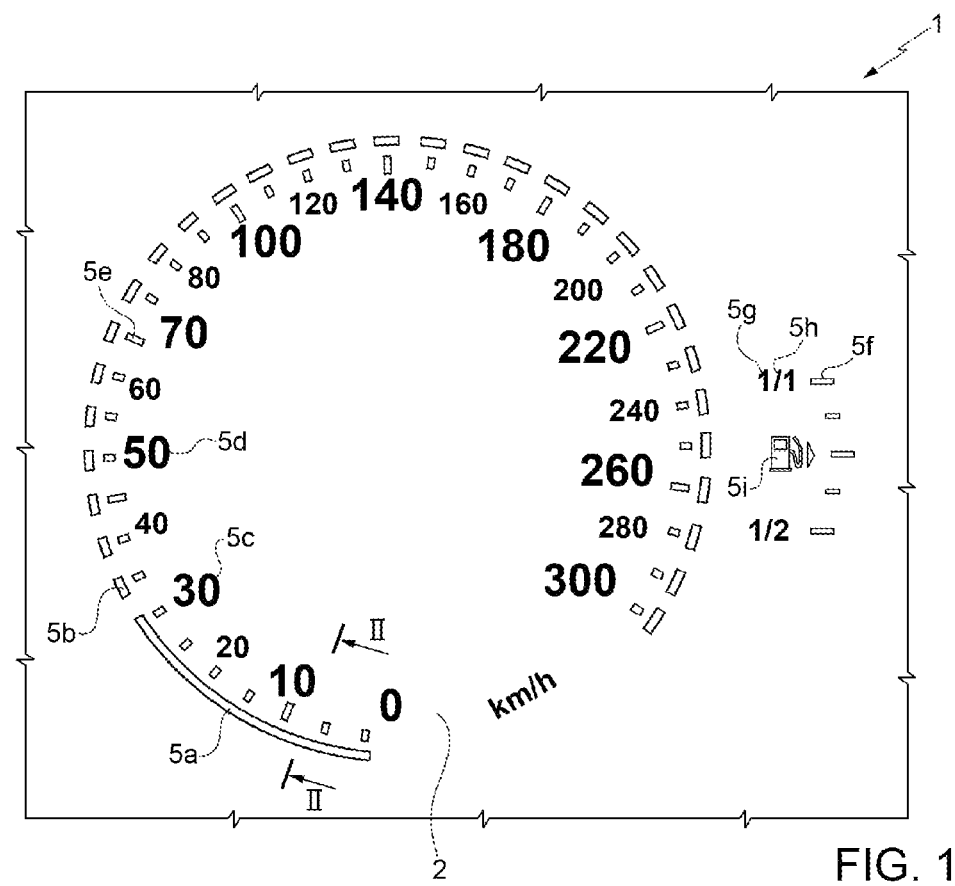
FIG. 1 is a partial front view of a preferred embodiment of the vehicle instrument panel equipped with a LED backlighting device for lighting a graphic area, according to the present invention.

In FIG. 1, reference numeral 1 indicates, as a whole, a (partially shown) vehicle instrument panel comprising a dial defined by a plate 2, preferably made of polycarbonate. The front surface of the plate 2 has a plurality of graphic areas, some of which are indicated by reference numbers 5a-5i, and which represent markers, graduated scales, numbers, logos, letters, bar graphs, etc. so as to supply the driver with corresponding information on driving and/or the state of the vehicle.

The portions of the plate 2 that define the above-stated graphic areas are light permeable, i.e. they are substantially transparent so that these graphic areas can be backlit, for example, in the case of night viewing conditions.

Figure 2:
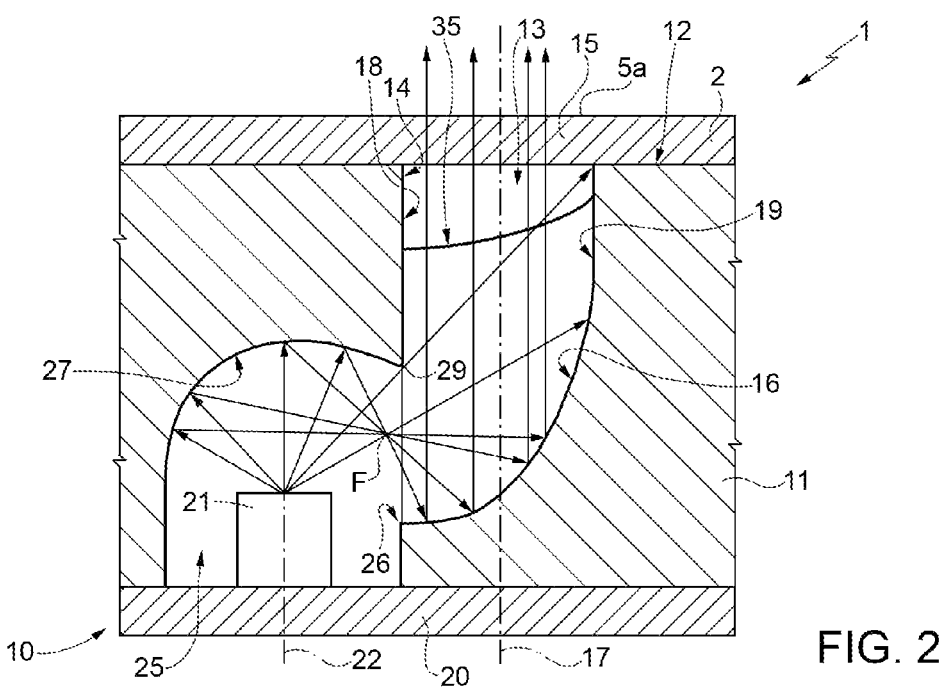
FIG. 2 is a cross-section along line II-II in FIG. 1 and schematically shows the LED backlighting device of the instrument panel of the present invention.

With reference to FIG. 2, the instrument panel 1 comprises a backlighting device 10, which is designed to light the graphic area 5a and comprises a body 11 made of a light-impermeable material, also known as a light-blocking material, and having a front face 12 on which the plate 2 rests.

The body 11 comprises a cavity 13, which is empty and has an outlet 14 made on face 12 and closed or engaged by a substantially transparent portion 15 that is part of the plate 2 and defines the graphic area 5a, as explained above. The cavity 13 is delimited at the back by a reflective surface 16, which is aligned with the outlet 14 along an axis 17, incident with respect to plate 2 and defining the mean direction along which light exits through the graphic area 5a.

In the preferred embodiment shown, axis 17 is orthogonal to the plate 2, but could have an angle of incidence other than 90°.

The cavity 13 is laterally delimited by two surfaces 18 and 19 that face each other, define the outlet 14 and are preferably parallel to axis 17. In particular, surface 19 extends as a prolongation of surface 16 up to the outlet 14.

The body 11 is arranged between the plate 2 and a printed circuit board 20 (also denoted by the acronym PCB), which is set apart from the plate 2 and supports at least one LED source 21 designed to emit light that backlights the graphic area 5a. The light coming from the LED source 21 is directed towards the plate 2. In the preferred embodiment shown, the board 20 is parallel to plate 2; however, if necessary, it can be oriented at a different angle.

For simplicity, the LED source 21 is considered a point light source. The LED source 21 has an optical axis 22 corresponding to the spatial direction in which the emitted light has maximum intensity. The optical axis 22 is orthogonal to the board 20 and is set apart from axis 17. The distance between axes 22 and 17 is such as to place the LED source 21 outside the cavity 13, namely laterally with respect to the projection of the graphic area 5a along axis 17. In particular, optical axis 22 is substantially parallel to axis 17.

In addition, the body 11 comprises a cavity 25, which houses the LED source 21, communicating with cavity 13 through an aperture 26 and is frontally delimited by a reflective surface 27 of the body 11. Surface 27 directly faces the LED source 21 along optical axis 22, i.e. without the interposition of other elements. The upper border of the aperture 26 is indicated by reference numeral 29 and is defined by an edge that joins surfaces 27 and 18. The position of the edge 29 and, consequently, the extension of surface 27 are such as to prevent light rays going directly from the LED source 21 to the outlet 14. In other words, the light rays from the LED source 21 that pass through the aperture 26 only strike surfaces 16 and 19.

Figure 3:
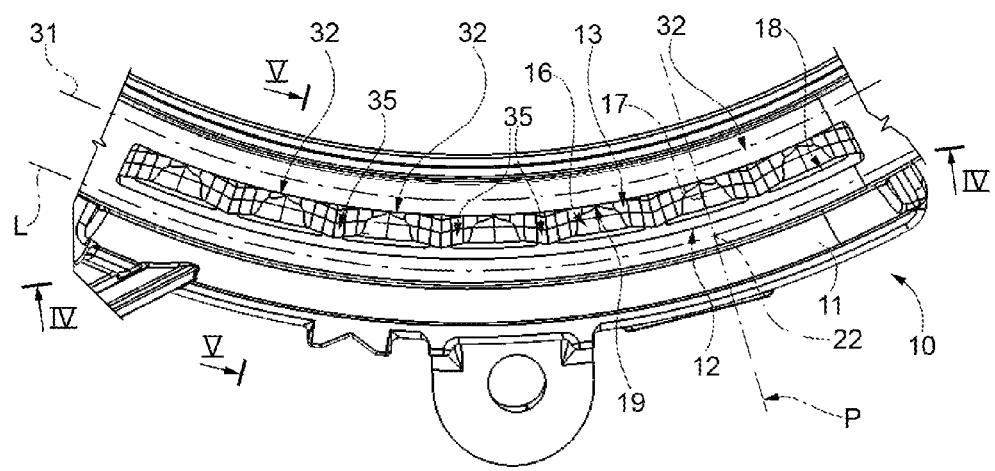
FIG. 3 is a front view that partially shows a component of the device in FIG. 2.
Figure 5:
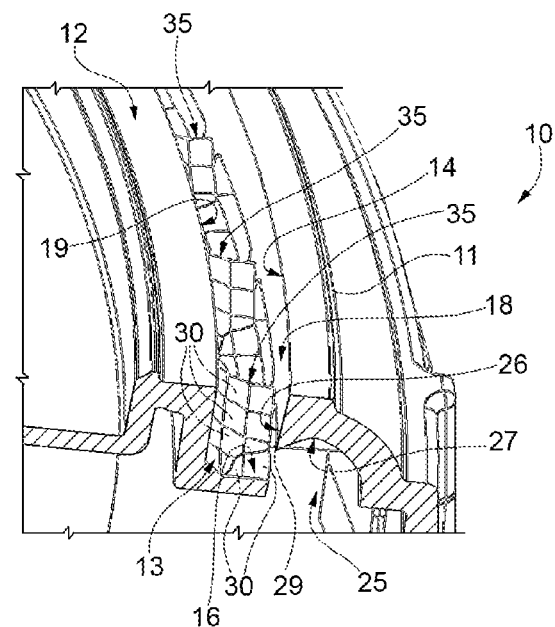
FIG. 5 is a perspective view of the component in FIG. 3 sectioned along the section plane indicated by line V-V in FIG. 3.
Figure 6:
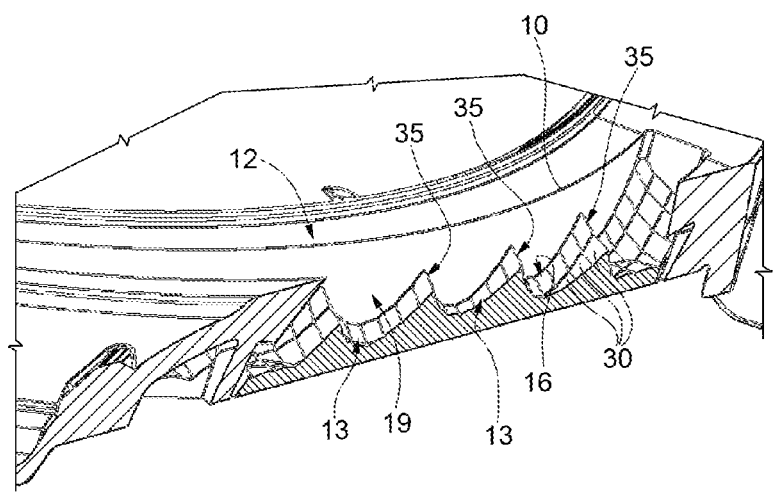
FIG. 6 is a perspective view of the component in FIG. 4 sectioned along the section plane indicated by line VI-VI in FIG. 3.

Surface 27 is shaped so as to have a cavity and reflect most of the incident light rays towards the aperture 26. The light rays that strike surface 16 are reflected towards the outlet 14, in order to backlight the graphic area 5a, and so these rays undergo at least two reflections. The section plane in FIG. 2 is a plane P (FIG. 3) on which axes 22 and 17 lie. Preferably, the trace of surface 16 on the section plane P approximates to a parabolic arc. Here, the term "approximate" means that the trace of surface 16 on the plane P coincides with a parabolic arc if the possible presence of expedients aimed at diffusing the light rays reflected from surface 13 is excluded. In particular, these expedients could be defined by the fact that the surface 16 is coarse (i.e. it is rough, satin finished or treated to diffuse the light), or that surface 16 is polished, but defined by prisms, or more in general by protuberances, which are indicated by reference numeral 30 in FIGS. 5 and 6 and protrude with respect to an ideal design surface. For example, the prisms or protuberances 30 are defined by small convex-shaped humps. Preferably, the above-mentioned ideal design surface (which obviously coincides with surface 16 in the absence of coarseness, prisms, etc.) is a sector of an elliptical paraboloid.

Still considering plane P, as visible in FIG. 2, the trace of surface 27 preferably comprises an elliptical arc. According to one preferred aspect of the present invention, the parabolic arc defined by the trace of surface 16 and the elliptical arc defined by the trace of surface 27 have a common focus F. In this way, the light rays reflected by surface 27 all tend to be concentrated on focus F to optimize lighting uniformity on the graphic area 5a. To optimize this effect, the second focus of the elliptical arc lies on axis 22.

Figure 4:
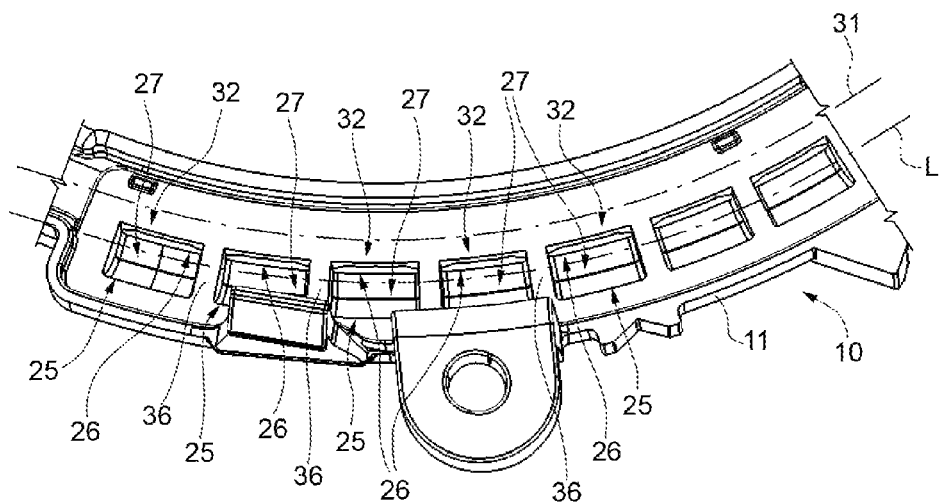
FIG. 4 is a rear view that partially shows a component of the device in FIG. 2.

In particular, as visible in FIG. 4, surface 27 is a cylindrical surface that has a generatrix that is at least partially elliptic and a directrix line L that is orthogonal to section plane P. Preferably, the directrix line L is slightly curved so as to define an arc.

In the particular embodiment shown, the graphic area 5a is elongated along a straight or curved direction 31, which in the specific case is parallel to the directrix line L. To completely light the graphic area 5a, the device 10 is constituted by a plurality of units or cells 32, which are substantially equal to each other, are arranged beneath the graphic area 5a and are positioned side by side along direction 31. In other words, each unit or cell 32 comprises a respective LED source 21, a respective cavity 13 and a respective cavity 25, which have been described above. As visible in FIGS. 2 and 5, the cavities 13 of the cells 32 communicate with each other along direction 31 through passages 35 defined at the front by plate 2 and at the back by respective edges or borders, which join adjacent surfaces 16. As visible in FIG. 4, the cavities 25 of the cells 32 are instead preferably isolated from each other by separators 36.

Figure 7:
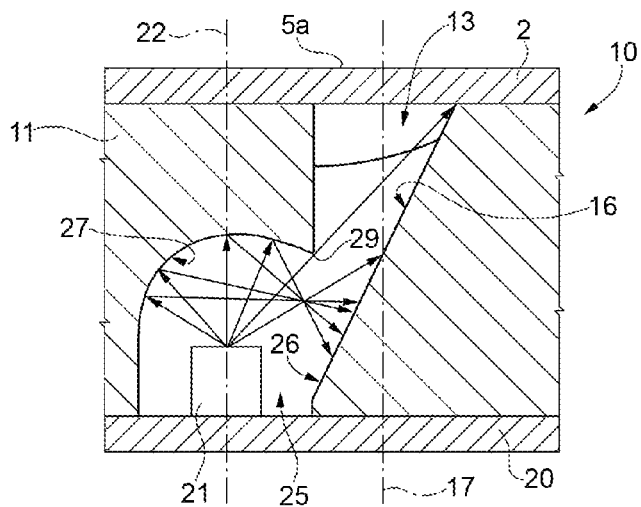
FIG. 7 is similar to FIG. 2 and schematically shows a possible variant of the instrument panel of the present invention.
Figure 8:
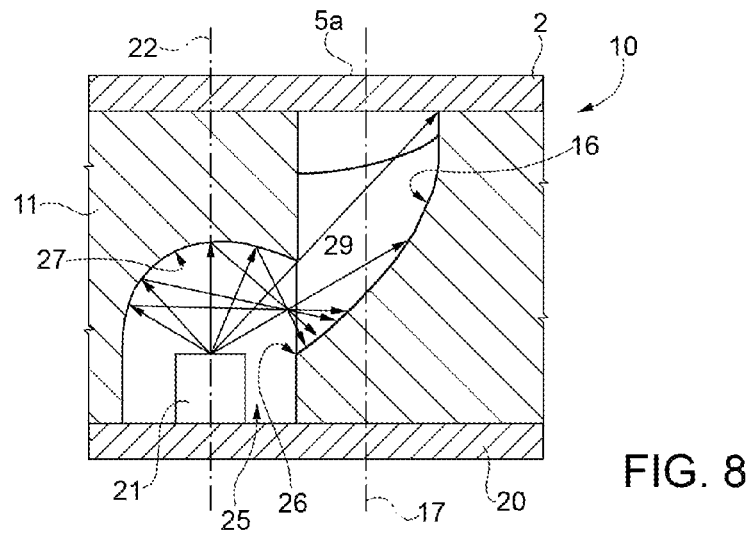
FIG. 8 is similar to FIG. 2 and schematically shows another possible variant of the instrument panel of the present invention.
Figure 9:
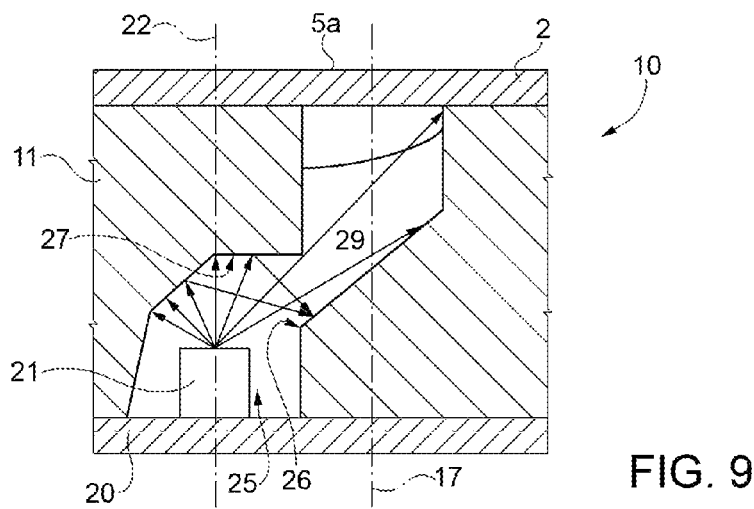
FIG. 9 is similar to FIG. 2 and schematically shows still another possible variant of the instrument panel of the present invention.

FIGS. 7 to 9 regard possible variants of the device 10, the components of which are indicated, where possible, by the same reference numerals used in FIG. 2. Even if these solutions are not optimal with respect to that in FIG. 2, it is possible to simplify the design and manufacture of the body 11 and still achieve a sufficient level of lighting uniformity through the graphic area 5a.

In particular, in FIG. 7 the trace of surface 16 approximates to a straight line (in which surface 16 is defined by a plane or a conical surface). In FIG. 8, the trace of surface 16 is a concave curve, but without a focus or having a focus that does not coincide with that of surface 27. In FIG. 9, instead of being a continuous curved surface, surface 27 is defined by a plurality of planes.

From the foregoing it is evident that the LED source 21 in the device 10 is not aligned the graphic area 5a, but is outside of cavity 13, while the body 11 is shaped so as to reflect the light from cavity 25 to cavity 13, and so the light does not arrive directly to the graphic area 5a. The reflection and possible diffusion of the light enables making the lighting of the graphic area 5a uniform. In other words, surface 27 is such as to shield the graphic area 5a from direct light emission and, at the same time, collect most of the emitted light and direct it to cavity 13.

Furthermore, in the configuration in FIG. 2, surface 16 is such as to, in turn, 'collect' the light rays in an optimal manner and direct them uniformly to the graphic area 5a. In particular, the paraboloid shape enables making the lighting uniform in every cell 32, also along direction 31 and not just in section plane P.

A further contribution to making the lighting uniform is supplied by possible expedients (superficial roughness, polished prisms, etc. for surface 16) provided to diffuse the light that is reflected. For example, with the solution in FIGS. 2-6, a lighting uniformity of at least 80% or thereabouts can be obtained.

At the same time, it is evident that the proposed solution does not contemplate the use of light-guide elements and does not require special treatments on portion 15, and so is able to overcome the above-described drawbacks of the prior art and be exceedingly inexpensive.

Finally, it is clear that modifications and variants regarding the instrument panel 1 described with reference to the accompanying drawings can be made without departing from the scope of the present invention, as defined in the appended claims.

In particular, the shapes of surfaces 16 could be different from those indicated by way of example; and/or the cavities 25 of the cells 32 could communicate with each other; and/or the device 10 could have a single cell 32, or a plurality of cells 32 separated from each other, depending on the characteristics of the graphic area to be backlit.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A vehicle instrument panel comprising:
   a dial comprising at least one light permeable portion, which defines a graphic area;
      a LED backlighting device for lighting said graphic area, the LED backlighting device including:
         at least one LED source having an optical axis corresponding to the direction in which the intensity of the light emitted into space is maximum;
         a reflector that reflects the light of said LED source towards an outlet engaged by said light permeable portion, said reflector including:
            a first reflecting surface, which defines a first cavity disposed so as to open towards said outlet along an illumination axis spaced apart from said optical axis, said optical axis and said illumination axis lying on a same plane (P);
            a second reflecting surface, which is aligned with said LED source along said optical axis, and defines a second cavity disposed so as to open towards said first cavity with an aperture disposed therebetween such that said second cavity communicates with said first cavity through said aperture and such that said second reflecting surface reflects most of the incident light toward said aperture;
   wherein said second reflecting surface is sized so as to intercept the light rays that are emitted from said LED source such that only reflected light passes through said outlet; and wherein, by cross-sectioning said second reflecting surface with said plane (P), the trace of said second reflecting surface defines an elliptical arc; wherein, by cross-sectioning said first reflecting surface with said plane (P), the trace of said first reflecting surface approximates a parabolic arc; and wherein said parabolic arc and said elliptical arc have a focus in common.

2. The instrument panel as set forth in claim 1, wherein said second reflecting surface is a cylindrical surface defined by a generatrix having at least one elliptical portion and by a directrix line (L) which is orthogonal to said plane (P).

3. The instrument panel as set forth in claim 1, wherein said first reflecting surface approximates a sector of an elliptical paraboloid.

4. The instrument panel as set forth in claim 1, wherein said elliptical arc has a further focus that lies on said optical axis.

5. The instrument panel as set forth in claim 1, further including a plurality of cells, each of which comprises one respective said LED source, one respective said first reflecting surface and one respective said second reflecting surface; said cells being positioned side by side in a longitudinal direction so as to backlight a graphic area elongated along said longitudinal direction.

6. The instrument panel as set forth in claim 5, wherein said first reflecting surfaces are connected one to another by edges and delimit respective first cavities communicating with each other through passages, each of which is defined at the front by said dial and at the back by one corresponding said edge.

7. The instrument panel as set forth in claim 1, wherein said first reflecting surface comprises a light diffuser.

8. The instrument panel as set forth in claim 1, wherein said second cavity houses said LED source.

9. The instrument panel as set forth in claim 1, wherein said first cavity is empty.

10. The instrument panel as set forth in claim 1, wherein the second reflecting surface is defined by an elliptoid that opens substantially toward the LED light source and away from the outlet, the first reflective surface is defined by an elliptoid that opens away from the LED light source and toward the outlet, and wherein an aperture is defined between the first and second reflecting surfaces through which light from the LED light source must pass in order to be reflected by the first reflecting surface.

* * * * *

UNITED STATES PATENT AND TRADEMARK OFFICE
CERTIFICATE OF CORRECTION

PATENT NO. : 10,017,109 B2
APPLICATION NO. : 14/666477
DATED : July 10, 2018
INVENTOR(S) : Alessandro Pasotti Page 1 of 1

It is certified that error appears in the above-identified patent and that said Letters Patent is hereby corrected as shown below:

Column 6, Line 21 (Claim 1) delete "outlet; and wherein" and insert therefor --outlet; wherein--.

Signed and Sealed this
Eleventh Day of December, 2018

Andrei Iancu
*Director of the United States Patent and Trademark Office*